Feb. 2, 1960  W. A. RAY  2,923,521
HUM FREE SOLENOID MECHANISM
Filed Sept. 24, 1956
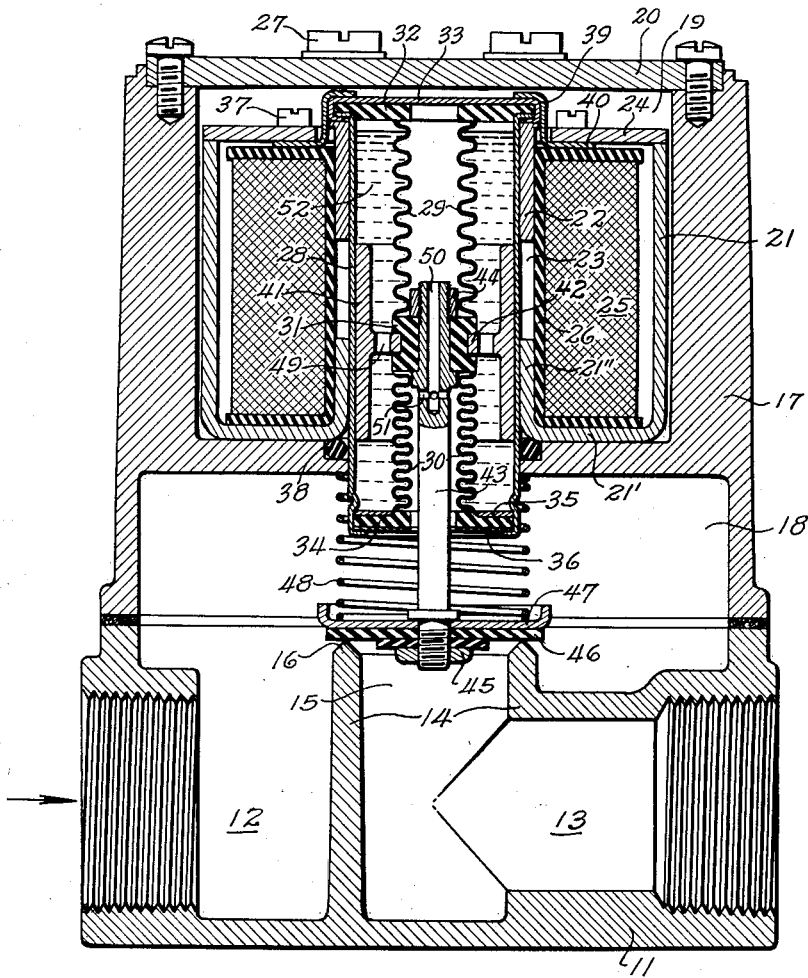
Inventor,
WILLIAM A. RAY
By John H. Rouse,
Attorney United States Patent Office 2,923,521
Patented Feb. 2, 1960

2,923,521
HUM FREE SOLENOID MECHANISM
William A. Ray, North Hollywood, Calif., assignor to General Controls Co., Glendale, Calif., a corporation of California Application September 24, 1956, Serial No. 611,580
18 Claims. (Cl. 251—54)

This invention relates to alternating-current solenoid operators; a general object of the invention being to provide an A.C. operator which is hum-free, highly effective and reliable, and wherein the solenoid plunger is sealed from the atmosphere and from the fluid controlled by a valve for whose operation the operator is employed.

Another object of the invention is to provide a solenoid operator, of the character described in the preceding object, whose plunger is unaffected by variation of external fluid pressure. I accomplish this object by providing flexible means closing the opposite ends of a guide tube wherein the plunger is reciprocable, and means for subjecting the outer sides of both of the flexible means to the same fluid pressure, which pressure may be that of the atmosphere or of the fluid controlled by a valve.

The arrangement described in the preceding paragraph has additional advantage when the operator is subjected to varying temperatures and the plunger is connected at each of its ends to the flexible closures, since the fluid pressure inside the sealed plunger-tube, acting through the flexible closures, then applies equal and opposite forces to the plunger, and its position is therefore not altered as a result of variation of the pressure inside the tube caused by variation of the ambient temperature.

A feature of this invention is the provision, inside the sealed plunger tube, of liquid whose viscosity is such that it acts as a "fluid glue" or adhesive agent in the clearance space between the cooperating surfaces of the plunger and the tube and prevents both radial and axial vibration of the plunger at the relatively high rate (say, 60 c.p.s.) of alternation of the current, while permitting gradual (i.e., from a fraction of a second up to a few seconds) operative movements of the plunger. Such liquid allows movement of the plunger at a relatively low rate but prevents substantial movement at a high rate, i.e., prevents noticeable hum, at a high rate commensurate with the frequency of the energizing source and thus such liquid may be considered to be an element of a low-pass filter. This feature is disclosed in my copending application Serial No. 594,280, filed July 27, 1956, now abandoned, and in a continuation-in-part thereof Serial No. 672,688, filed July 18, 1957.

Another object is to provide a solenoid operator of the character described wherein the plunger is arranged so that it floats magnetically in the tube while the solenoid is energized.

Another object is to provide, for closing the ends of the plunger tube, flexible means that are compact but capable of compression and extension to a high degree, and I accomplish this object by providing these means in the form of expansible-contractible bellows projecting into the plunger tube; an ancillary object being to increase the space for the bellows by providing a deep recess in each end of the plunger.

For full understanding of the invention, and further appreciation of its objects and advantages, reference is to be had to the following detailed description and accompanying drawing, and to the appended claims.

The single figure of the drawing is a sectional view of a solenoid valve structure embodying this invention.

In the drawing, the numeral 11 indicates a valve casing having an inlet chamber 12 and an outlet chamber 13 separated by an angled partition 14 having a port 15 around whose upper end a valve seat 16 is raised.

Secured to the open top of the valve casing is a body 17 having in its underside a cavity 18 which forms an extension of the inlet chamber 12. In the upper part of body 17 is a deep recess 19 which is closed at its top by a plate 20. Mounted inside the recess 19 is a solenoid device having a magnetic frame which comprises a cylindrical outer portion or shell 21 whose lower end is formed to provide a horizontal wall 21' flanged at its center to form a tubular upward extension 21''. Aligned with the tubular extension 21'', and spaced therefrom to provide a magnetic air-gap 23, is a tube 22 having at its top a narrow flange resting on the inner margin of a washer 24 covering the top of shell 21 and completing the magnetic frame. Inside this frame is an annular coil 25 wound on a bobbin 26 and having leads (not shown) connected to screw terminals 27 on plate 20.

Fitting closely inside tubes 21'' and 22, and projecting through an opening in the bottom wall of recess 19, is a thin-walled cylindrical tube 28, of nonmagnetic material, whose opposite ends are closed by a pair of expansible-contractible bellows 29 and 30, preferably of elastic material such as synthetic rubber, whose inner ends are integrally joined by a thick tubular portion 31. At the top of, and integral with, bellows 29 is an elastic washer 32 which is sealingly clamped at its margin to the flanged top of tube 28 by means of a thin metallic disk 33 whose margin is folded around and under the flange of tube 28. In like manner, the other bellows 30 is provided at its bottom with an integral elastic washer 34, the lower portion of tube 28 being crimped to hold this washer sealingly in place with thin metallic washers 35 and 36 on its opposite sides.

The magnetic frame 21, 22, 24 is clamped to the bottom wall of recess 19 by long screws 37 passing through openings in ears (not shown) on the edge of washer 24 and threaded in openings in the bottom wall, an elastic O-ring 38, compressed by ιe frame, serving to prevent leakage of fluid upwardly around tube 28. Tube 28 is held in the magnetic frame by a cupped washer 39, on top of the tube assembly, having fingers 40 which pass through notches in the inner margin of washer 24 and are bent out under the washer.

Freely reciprocable in tube 28 is a cylindrical solenoid-plunger 41 having a deep recess in its opposite ends separated by a wall 42 in the median plane of the plunger. The plunger-wall 42 has a central opening snugly fitting the bottom of a groove in the periphery of the portion 31 which joins the inner ends of bellows 29, 30. Inside the lower bellows is a stem 43 whose upper part projects through the tubular rubber portion 31 and is fastened thereto by a nut 44 threaded on the top of the stem, the stem having a shoulder abutting the underside of the rubber sleeve. Secured to the shouldered bottom end of stem 43, by means of a nut 45, is a soft closure-disk 46 backed by a stiffening disk 47 and cooperating with the valve seat 16. Plunger 41 and stem 43 are biased downwardly, and closure 46 to seated position, by the force of a spring 48 compressed between disk 47 and the top wall of cavity 18.

When, upon passage of current through coil 25, the solenoid device is energized, the plunger is attracted upwardly to a position wherein it floats magnetically in the tube with the median plane of the plunger generally central of the air-gap 23; the closure 46 then being in fully-open position.

The annular spaces defined by tube 28, bellows 29 and 30, and the respective upper and lower ends of the plunger 41, are substantially filled with a viscous liquid indicated at 52, these annular spaces being in intercommunication by way of openings 49 through the plunger wall 42. The liquid acts as an adhesive agent in the clearance space between the plunger and the tube so that A.C. vibration of the plunger is virtually eliminated and operative movements of the plunger retarded.

The degree of viscosity of the liquid necessary to produce the desired result under given load conditions depends on the area of the cooperating surfaces of the tube and plunger, and on the clearance between these parts; by increasing the area or decreasing the clearance, the degree of viscosity may be decreased. However, the clearance cannot be reduced beyond a practical limit, and, moreover, there must be space between the plunger and the guide tube for at least a thin film of the liquid in order for it to be effective as an adhesive agent.

To produce a compact light-load structure, such as a domestic gas-valve, wherein the area of the cooperating surfaces of the plunger and tube is relatively small, I have found that in order to eliminate A.C. hum it is necessary to employ liquid whose viscosity is high by comparison with, for example, that of ordinary lubricating oils. While liquids such as petroleum oils may be employed, those of the silicone type (such as the methyl silicone fluids) are preferred because of the small change of viscosity of these silicone liquids over a wide range of temperature. When the diametrical plunger-clearance is about 0.005 inch, silicone liquids rated at 1,000 to 12,500 centistokes viscosity are generally suitable.

The operating time of the valve, or rate of operative movement of the plunger (both when it is attracted and when, upon subsequent deenergization of the solenoid device, the plunger falls under the force of bias spring 48) is determined mainly by the viscosity of the liquid; the flow capacity of the openings 49 in the plunger wall 42 being such that it has but little effect on the operating time when high-viscosity liquid is employed.

The portion of the plunger stem inside the upper bellows has an axial opening 50 which communicates at its lower end with branch openings 51 leading to the space inside and below the lower bellows. The sides of both bellows at the outside of the sealed plunger compartment are therefore subjected to the same fluid pressure (which, when the solenoid operator is employed for operating a valve as shown in the drawing, is the pressure of the fluid in the inlet chamber 12, 18) and variation of this pressure has no effect on the plunger to which the bellows are connected.

The flexible means could be in the form of simple diaphragms; however, the elongated bellows extending within the plunger recesses as shown, have the advantage of being compact while still permitting a wide range of movement of the plunger. The bellows are preferably arranged so that they are in stable equilibrium when the plunger is midway between its moved positions, so that each bellows is subjected to the same degree and kind of flexure in operation. Rubber-like material for the bellows has the advantage (over metal) that it does not expand or contract appreciably with change of temperature.

When the plunger is connected to both of the flexible means, variation of pressure inside the plunger tube, due to variation of ambient temperature, has no effect on the plunger since the forces then acting on it through the flexible means are equal and opposite. In the illustrated embodiment of the invention, for example, there is no tendency for the valve closure to be raised from its seat if the structure is subjected to abnormally low temperature; and there would be but little tendency for that to happen even if the plunger were not connected to the upper bellows—because of the bias of the valve closure, and the fact that the upper bellows would then be free to flex inwardly with reduction of the internal pressure.

The specific embodiment of my invention herein shown and described is obviously susceptible of modification, beyond that described, without departing from the spirit of the invention, and I intend therefore to be limited only by the scope of the appended claims.

I claim as my invention:

1. In an A.C. solenoid operator: a guide tube containing a viscous liquid; a plunger reciprocable in said tube; a solenoid device around said tube for operating said plunger; a pair of flexible means having equal effective fluid pressure areas closing the opposite ends of said tube so as to form, with the interior of the tube, a sealed compartment for said plunger; and means for subjecting the sides, outside said compartment, of both of said flexible means to substantially the same fluid pressure, one of said flexible means being attached to said plunger.

2. An A.C. solenoid operator according to claim 1 wherein a relatively large area of said plunger is in such close proximity to the side wall of said guide tube that it is separated therefrom only by a film of said liquid, the viscosity of the liquid being high enough that said film of liquid, by its adhesive action, prevents A.C. vibration of the plunger.

3. An A.C. solenoid operator according to claim 2 wherein the operator is of the type wherein the plunger floats magnetically in said tube while said solenoid device is energized.

4. An A.C. solenoid operator according to claim 3 wherein said flexible means are joined to said plunger and form, with the plunger and said tube, a generally-annular space for said liquid at both ends of the tube.

5. An A.C. solenoid operator according to claim 4 wherein said outer sides of the flexible means are subjected to said substantially-same fluid pressure by way of a generally-axial opening through said plunger.

6. In an A.C. solenoid valve: a valve structure having a passage therethrough; a closure for controlling flow through said passage; an A.C. solenoid device comprising a reciprocable plunger operatively connected to said closure, and a guide tube containing a viscous liquid wherein said plunger is reciprocable; means, including a pair of flexible means having equal effective fluid pressure responsive areas, closing the opposite ends of said tube to form, with the interior of the tube, a sealed compartment for the plunger; one of said flexible means being joined to the plunger; means for subjecting the side, outside said compartment, of said one of said flexible means to the pressure of the fluid in said passage; and means for subjecting to said fluid pressure the side, outside the compartment, of the other of said flexible means.

7. An A.C. solenoid valve according to claim 6 wherein said other of the flexible means is subjected to said fluid pressure by way of an opening through said plunger.

8. An A.C. solenoid valve according to claim 6 wherein a relatively large area of said plunger is in such close proximity to the side wall of said guide tube that it is separated therefrom only by a film of said liquid, the viscosity of the liquid being high enough that said film of liquid, by its adhesive action, prevents A.C. vibration of the plunger.

9. An A.C. solenoid valve according to claim 8 wherein said solenoid device is of the type wherein said plunger floats magnetically in said tube while said solenoid device is energized.

10. An A.C. solenoid valve according to claim 9 wherein both of said flexible means are joined to said plunger and form, with the plunger and said tube, a generally-annular space for said liquid at both ends of the tube.

11. In an A.C. solenoid valve: a valve structure having an inlet chamber and an outlet chamber separated by a ported partition providing a valve seat; a closure cooperable with said valve seat; a solenoid plunger having a stem operatively connected to said closure; a guide tube containing a viscous liquid wherein said plunger is reciprocable; a solenoid device around said tube for operating said plunger and thereby operating said closure; a first flexible means closing one end of said tube and joined to said plunger; said one end of the tube extending sealingly to said inlet chamber so that said first flexible means is subjected to the pressure of fluid in that chamber; a second flexible means having the same effective fluid pressure responsive area as said first flexible means closing the opposite end of the tube and forming, with said first flexible means and the interior of the tube, a sealed compartment for said plunger; and means for subjecting to said inlet-chamber pressure the side, outside said compartment, of said second flexible means.

12. An A.C. solenoid valve according to claim 11 wherein said second flexible means is subjected to said inlet-chamber pressure by way of an opening through said plunger.

13. An A.C. solenoid valve according to claim 11 wherein a relatively large area of said plunger is in such close proximity to the side wall of said guide tube that it is separated therefrom only by a film of said liquid, the viscosity of the liquid being high enough that said film of liquid, by its adhesive action, prevents A.C. vibration of the plunger.

14. An A.C. solenoid valve according to claim 13 wherein said solenoid device is of the type wherein said plunger floats magnetically in said tube while said solenoid device is energized.

15. An A.C. solenoid valve according to claim 14 wherein both of said flexible means are joined to said plunger and form, with the plunger and said tube, a generally-annular space for said liquid at both ends of the tube.

16. An A.C. solenoid valve according to claim 15 wherein said plunger has a deep central recess in each of its ends separated by a wall in the median plane of the plunger, and said first and second flexible means is each in the form of an expansible-contractible bellows extending into the respective ones of said recesses and joined to said median wall.

17. An A.C. solenoid valve according to claim 16 wherein said bellows are of rubber-like elastic material.

18. An A.C. solenoid valve according to claim 17 wherein said median wall of the plunger has a central opening therethrough, and the inner ends of said bellows extend into said central opening and are there interunited.

References Cited in the file of this patent

UNITED STATES PATENTS

| | | |
|---|---|---|
| 2,291,599 | Ray | Aug. 4, 1942 |
| 2,622,622 | Ray | Dec. 23, 1952 |
| 2,735,047 | Garner | Feb. 14, 1956 |
| 2,810,067 | Fowler | Oct. 15, 1957 |